US011639076B2

(12) United States Patent
Fukushima

(10) Patent No.: US 11,639,076 B2
(45) Date of Patent: May 2, 2023

(54) MOTORCYCLE TIRE

(71) Applicant: Sumitomo Rubber Industries, Ltd., Kobe (JP)

(72) Inventor: Kazuki Fukushima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 205 days.

(21) Appl. No.: 16/983,573

(22) Filed: Aug. 3, 2020

(65) Prior Publication Data
US 2021/0061015 A1 Mar. 4, 2021

(30) Foreign Application Priority Data

Sep. 3, 2019 (JP) .............................. JP2019-160674

(51) Int. Cl.
 *B60C 9/22* (2006.01)
 *B60C 9/10* (2006.01)
(52) U.S. Cl.
 CPC ................. *B60C 9/22* (2013.01); *B60C 9/10* (2013.01); *B60C 2200/10* (2013.01)
(58) Field of Classification Search
 CPC .... B60C 9/22; B60C 9/20; B60C 9/18; B60C 2200/10; B60C 2009/2025; B60C 2009/2012; B60C 2009/2016
 See application file for complete search history.

(56) References Cited

U.S. PATENT DOCUMENTS

| 3,024,828 | A | 3/1962 | Smith et al. |
| 2017/0274707 | A1* | 9/2017 | Ichiryu .............. B29D 30/1635 |
| 2018/0056721 | A1* | 3/2018 | Tochiki ..................... B60C 9/20 |

FOREIGN PATENT DOCUMENTS

| CN | 103879234 A | 6/2014 |
| EP | 3069862 A1 | 9/2016 |
| JP | 2018-43748 A | 3/2018 |

OTHER PUBLICATIONS

Extended European Search Report, dated Nov. 16, 2020, for European Application No. 20189115.7.

* cited by examiner

*Primary Examiner* — Cedrick S Williams
(74) *Attorney, Agent, or Firm* — Birch, Stewart, Kolasch & Birch, LLP

(57) ABSTRACT

A tire includes a tread reinforcing layer. The tread reinforcing layer includes a ply reinforcing portion in which belt-shaped plies are wound. The ply reinforcing portion includes a lattice-shaped portion in which a plurality of the first inclined portions and a plurality of the second inclined portions intersect with each other such that side edges of the first inclined portions and side edges of the second inclined portions do not contact with each other so as to have space portions between them. Each of the first inclined portions and the second inclined portions has an angle with respect to a tire circumferential direction continuously decreased from an inner side in a tire axial direction to an outer side in the tire axial direction.

16 Claims, 4 Drawing Sheets

MOTORCYCLE TIRE

TECHNICAL FIELD

The present invention relates to a motorcycle tire.

BACKGROUND ART

Patent Document 1 listed below has proposed a tire provided with middle shallow grooves and middle sipes in middle land regions.

PRIOR ART DOCUMENT

Patent Document

[Patent Document 1]
Japanese Unexamined Patent Application Publication No. 2018-43748

SUMMARY OF THE INVENTION

Problems to be Solved by the Invention

In the motorcycle tire disclosed in Patent Document 1, there is room for improvement in stability performance in a late stage of cornering in which large lateral force is applied.

The present invention was made in view of the above, and a primary object thereof is to provide a motorcycle tire capable of improving the stability performance in the late stage of cornering.

Means for Solving the Problems

The present invention is a motorcycle tire including a toroidal carcass, and a tread reinforcing layer arranged outside the carcass in a tire radial direction and inside of a tread portion, wherein the tread reinforcing layer includes a ply reinforcing portion in which belt-shaped plies are wound, each of the belt-shaped plies is formed by at least one reinforcing cord covered with a topping rubber, the ply reinforcing portion includes a plurality of first inclined portions, in which the belt-shaped plies are inclined to one side with respect to a tire circumferential direction, and a plurality of second inclined portions, in which the belt-shaped plies are inclined to a side opposite to the plurality of the first inclined portions with respect to the tire circumferential direction, the plurality of the first inclined portions are arranged such that side edges thereof are not in contact with each other, the plurality of the second inclined portions are arranged such that side edges thereof are not in contact with each other, the ply reinforcing portion includes a lattice-shaped portion in which the plurality of the first inclined portions and the plurality of the second inclined portions intersect with each other so as to have space portions between them, and in each of the first inclined portions and the second inclined portions, an angle thereof with respect to the tire circumferential direction is continuously decreased from an inner side in a tire axial direction to an outer side in the tire axial direction.

In the motorcycle tire according to the present invention, it is preferred that the ply reinforcing portion is provided with a plurality of intersection portions, each in which one of the first inclined portions and one of the second inclined portions intersect, arranged in the tire axial direction, and at an axially outermost one of the intersection portions, each of the angles of the first inclined portion and the second inclined portion is 3 degrees or more and 15 degrees or less.

In the motorcycle tire according to the present invention, it is preferred that each of the angles of the first inclined portion and the second inclined portion at axially innermost points thereof is 10 degrees or more and 20 degrees or less.

In the motorcycle tire according to the present invention, it is preferred that the space portions are arranged in the tire axial direction, and the space portions arranged on the axially outer side have axial lengths smaller than those of the space portions arranged on the axially inner side.

In the motorcycle tire according to the present invention, it is preferred that each of the first inclined portions and the second inclined portions is formed in an arc shape.

In the motorcycle tire according to the present invention, it is preferred that each of the first inclined portions and the second inclined portions is formed in an arc shape convex axially outward.

In the motorcycle tire according to the present invention, it is preferred that the ply reinforcing portion is provided at an axially outer end thereof with a plurality of connecting portions each in which the first inclined portion and the second inclined portion are connected.

In the motorcycle tire according to the present invention, it is preferred that each of the first inclined portions and the second inclined portions crosses a tire equator.

In the motorcycle tire according to the present invention, it is preferred that each of the first inclined portions and the second inclined portions is point symmetric on the tire equator.

In the motorcycle tire according to the present invention, it is preferred that the belt-shaped plies are not provided with a portion in which the angle with respect to the tire circumferential direction is continuously zero degrees in the tire circumferential direction.

In the motorcycle tire according to the present invention, it is preferred that each of the first inclined portions and the second inclined portions extends between ends of the ply reinforcing portion on both tread edge sides.

In the motorcycle tire according to the present invention, it is preferred that in each of the first inclined portions and the second inclined portions, the angle changes continuously from a tire equator to an end thereof on a side of a tread edge.

Effects of the Invention

The motorcycle tire according to the present invention includes the ply reinforcing portion in which the belt-shaped plies are wound. The ply reinforcing portion includes the lattice-shaped portion in which the plurality of the first inclined portions and the plurality of the second inclined portions which are inclined to the opposite side to the first inclined portions intersect with each other so as to have the space portions between them.

In each of the first inclined portions and the second inclined portions, the angle thereof with respect to the tire circumferential direction is continuously decreased from the axially inner side to the axially outer side. The first inclined portions and the second inclined portions configured as such make rigidity of the tread portion continuously increasing axially outwardly, therefore, it is possible that the reaction force upon tilting of the tire is exerted according to the camber angle. Thereby, excellent stability performance is exerted even in the late stage of cornering in which the tire is tilted greatly.

MODE FOR CARRYING OUT THE INVENTION

An embodiment of the present invention will now be described in conjunction with accompanying drawings.

Figure 1:
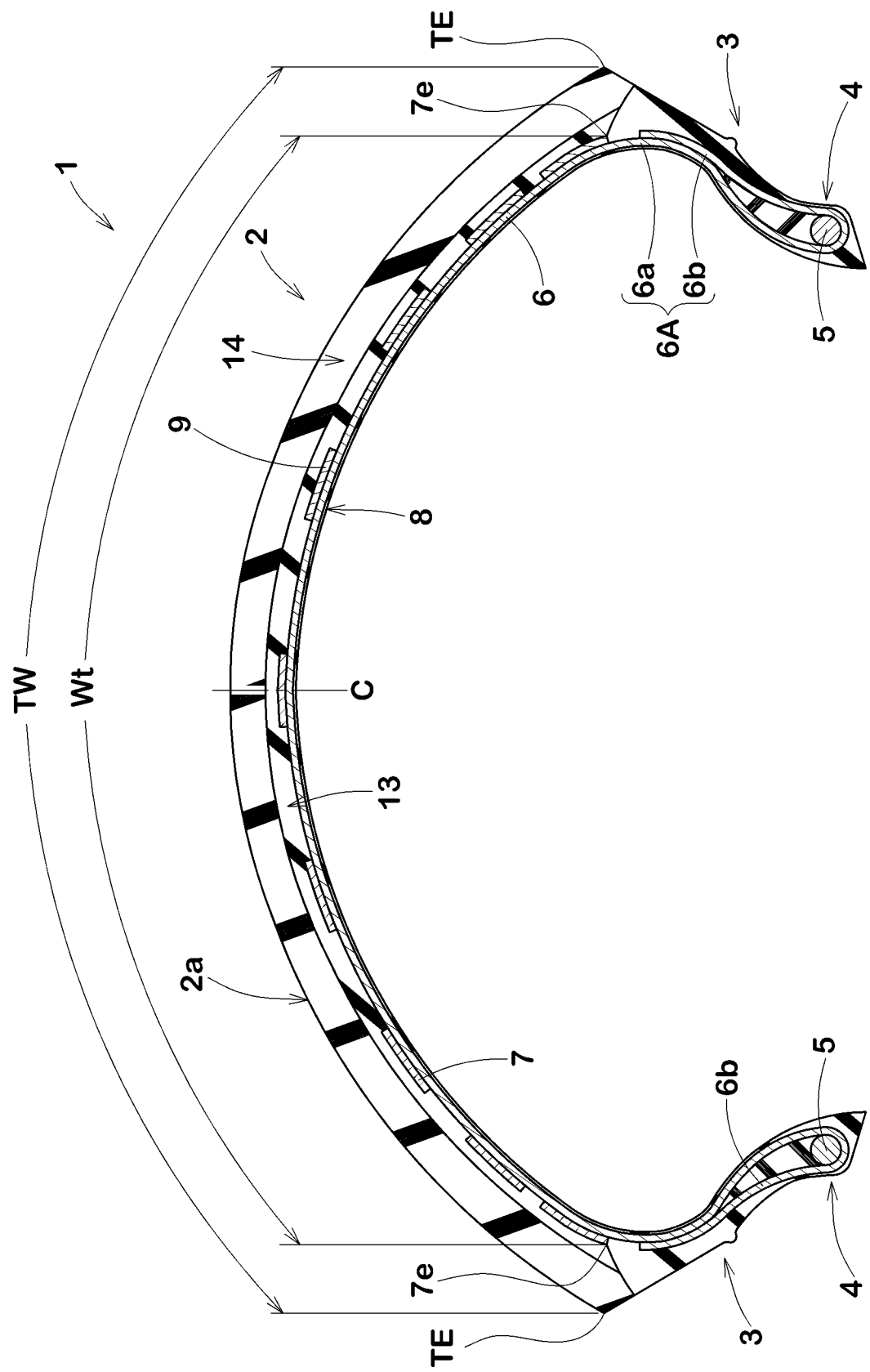
FIG. 1 a cross-sectional view of a motorcycle tire according to an embodiment of the present invention.

FIG. 1 is a tire meridian section of a motorcycle tire 1 according to the present embodiment (hereinafter, may be simply referred to as "tire 1") in a standard state passing through a tire rotational axis (not shown). A pneumatic tire is shown in FIG. 1.

The "standard state" is a state in which the tire 1 is mounted on a standard rim (not shown), inflated to a standard inner pressure, and loaded with no tire load. Dimensions and the like of various parts of the tire 1 are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 according to the present embodiment has a tread portion 2 including a ground contacting surface (2a), a toroidal carcass 6, and a tread reinforcing layer 7 arranged outside the carcass 6 in a tire radial direction and inside the tread portion 2.

The carcass 6 is formed by at least one carcass ply (6A), for example. The carcass ply (6A) is formed by carcass cords arranged at angles each of 75 degrees or more and 90 degrees or less with respect to a tire equator (C) and covered with an unvulcanized topping rubber, for example. The carcass ply (6A) includes a main body portion (6a) and a pair of turned up portions (6b), for example. The main body portion (6a) extends between bead cores 5 of bead portions 4 arranged on both sides in a tire axial direction via sidewall portions 3 and the turned up portions (6b) are connected with the main body portion (6a) on both sides in the tire axial direction of the main body portion (6a).

In the tire meridian section, the tread reinforcing layer 7 is curved along the tread portion 2 and is formed over almost the entire width of the tread portion 2. Thereby, the tread reinforcing layer 7 can increase the rigidity of the tread portion 2 over the entire area of the tread portion 2. From such a point of view, it is preferred that a width (Wt), which is along the ground contacting surface (2a), of the tread reinforcing layer 7 is 75% or more and 95% or less of a width TW, which is along the ground contacting surface (2a), between tread edges (TE) (hereinafter, may be referred to as "tread development width TW" in this specification).

The tread reinforcing layer 7 of the present embodiment includes a ply reinforcing portion 8 formed by winding belt-shaped plies 9 on the carcass 6.

Figure 2:
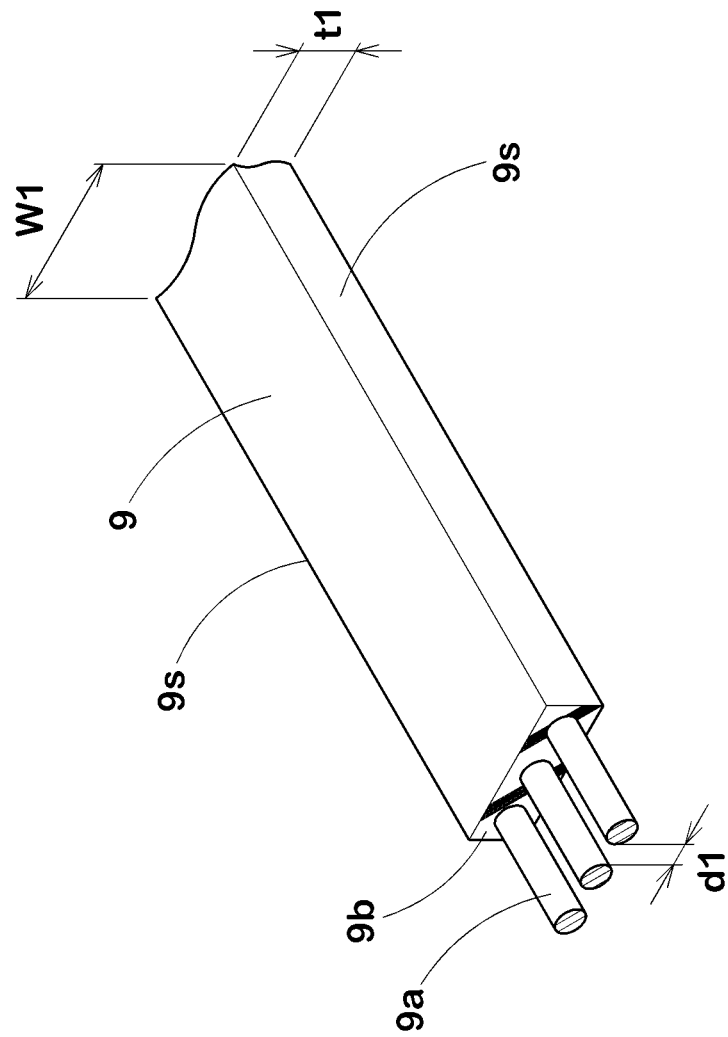
FIG. 2 a perspective view of one of the belt-shaped plies.

FIG. 2 is a perspective view of one of the belt-shaped plies 9. As shown in FIG. 2, each of the belt-shaped plies 9 is formed by at least one reinforcing cord (9a), three reinforcing cords (9a) in the present embodiment, covered with a topping rubber (9b). The reinforcing cords (9a) are made of steel cords, for example. The reinforcing cords (9a) may be made of organic fibers. Preferred organic fibers include nylon fibers, polyester fibers, rayon fibers, polyethylene naphthalate fibers, or aramid fiber cords, for example.

Each of the belt-shaped plies 9 includes both side edges (9s) extending in a longitudinal direction of the belt-shaped ply 9, and has a substantially rectangular cross section, for example. It is preferred that a width (W1) of each of the belt-shaped plies 9 is 2.5 mm or more and 12.0 mm or less, for example. It is preferred that a thickness (t1) of each of the belt-shaped plies 9 is 0.6 mm or more and 3.0 mm or less, for example. It is preferred that a distance (d1) between adjacent reinforcing cords (9a) is 0.5 mm or more and 10 mm or less. In the present embodiment, the reinforcing cords (9a) extend along the side edges (9s).

Figure 3:
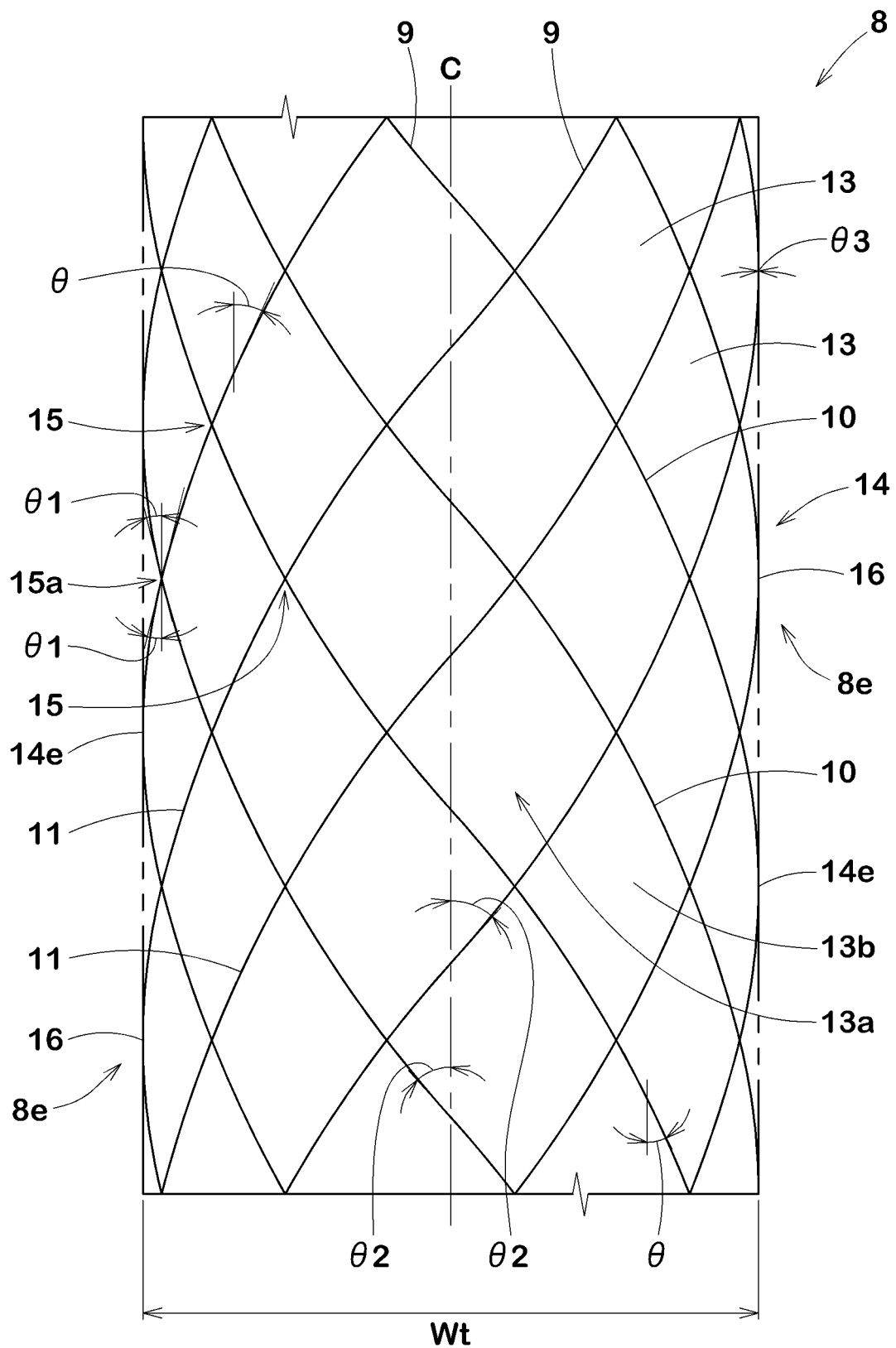
FIG. 3 an overall development view of a ply reinforcing portion of a tread reinforcing layer.

FIG. 3 shows a plan view in which the ply reinforcing portion 8 is developed. In FIG. 3, each of the belt-shaped plies 9 of the ply reinforcing portion 8 is shown by one solid line for convenience. As shown in FIG. 3, the ply reinforcing portion 8 includes a plurality of first inclined portions 10 and a plurality of second inclined portions 11. In each of the first inclined portions 10, the belt-shaped ply 9 is inclined to one side (upward to the left in FIG. 3) with respect to a tire circumferential direction, for example. In each of the second inclined portions 11, the belt-shaped ply 9 is inclined to a side opposite to the first inclined portions 10 (upward to the right in FIG. 3) with respect to the tire circumferential direction.

In the present embodiment, each of the first inclined portions 10 is arranged such that the side edges (9s) thereof do not contact with the side edges (9s) of other first inclined portions 10. In the present embodiment, each of the second inclined portions 11 is arranged such that the side edges (9s) thereof do not contact with the side edges (9s) of other second inclined portions 11. Thereby, the ply reinforcing portion 8 of the present embodiment is formed to include a lattice-shaped portion 14 in which the plurality of the first inclined portions 10 and the plurality of the second inclined portions 11 intersect with each other so as to have space portions 13. In the ply reinforcing portion 8 configured as such, the lattice-shaped portion 14 has a high torsional rigidity, therefore, it is possible that the behavior of the tire 1 during cornering is stabilized.

In each of the first inclined portions 10 and the second inclined portions 11, an angle θ with respect to the tire circumferential direction is continuously decreased from an inner side in a tire axial direction to an outer side in the tire axial direction. In the first inclined portions 10 and the second inclined portions 11 configured as such, a lateral rigidity of the tread portion 2 is continuously increased toward the outer side in the tire axial direction, therefore, the reaction force upon tilting of the tire 1 can be exerted according to the camber angle. Thereby, excellent stability performance is exerted even in the late stage of cornering in which the tire 1 is tilted greatly. Further, the change in the lateral rigidity between the inner side and the outer side in the tire axial direction becomes gentle, therefore, steering easiness and steering response become smooth. Thereby, the stability performance during cornering is also improved.

Each of the first inclined portions 10 and the second inclined portions 11 extends between ends (8e) on both tread edge (TE) sides. In other words, the ply reinforcing portion 8 in the present embodiment is formed by one lattice-shaped portion 14. The lattice-shaped portion 14 is formed on both sides in the tire axial direction with the tire equator (C) in between, for example. In the lattice-shaped portion 14 of the present embodiment, both axial ends (14e) thereof form both axial ends (8e) of the ply reinforcing portion 8, in other words, both axial ends (7e) of the tread reinforcing layer 7. The ply reinforcing portion 8 configured as such has the large torsional rigidity.

In each of the first inclined portions 10 and the second inclined portions 11, the angle θ with respect to the tire circumferential direction continuously changes from the tire equator (C) to both ends (8e) on the sides of the tread edges (TE). The tire 1 configured as such can increase the reaction force against the tilting of the tire 1 at the time of full-bank, and makes the steering easiness and the steering response smooth in a large cornering range from an early stage of cornering to the late stage of cornering, thereby, the stability performance during cornering is improved.

The ply reinforcing portion 8 is provided with a plurality of intersection portions 15, where the first inclined portions 10 and the second inclined portions 11 intersect, arranged in the tire axial direction. It is preferred that each of angles θ1 between the first inclined portions 10 and the second inclined portions 11 at axially outermost intersection portions (15a) is 3 degrees or more and 15 degrees or less. If each of the angles θ1 is less than 3 degrees, the change in the angles θ between the inner side and the outer side in the tire axial direction of the first inclined portions 10 and the second inclined portions 11 becomes large, therefore, rigidity difference in the tire axial direction becomes large. As a result, it is possible that the steering easiness and the steering response during cornering becomes abrupt, therefore, the stability performance during cornering may be deteriorated. If each of the angles θ1 is more than 15 degrees, the rigidity in the tire axial direction in an axially outer part of the tread portion 2 becomes small, therefore, it is possible that tilting easiness in the late stage of cornering is deteriorated.

It is preferred that each of angles θ2 between the first inclined portions 10 and the second inclined portions 11 on the axially innermost side (on the tire equator (C) in the present embodiment) is 10 degrees or more and 20 degrees or less. If each of the angles θ2 is less than 10 degrees, during straightaway driving, the rigidity in the tire circumferential direction becomes small in a part of the tread portion 2 in the vicinity of the tire equator (C) to which large ground contact pressure is applied, therefore, it is possible that straight running stability is deteriorated. If each of the angles θ2 is more than 20 degrees, the change in the angles θ between the inner side and the outer side in the tire axial direction of the first inclined portions 10 and the second inclined portions 11 becomes large, therefore, it is possible that the steering easiness and the steering response during cornering becomes abrupt.

Each of the first inclined portions 10 and the second inclined portions 11 is formed in an arc shape, for example. The first inclined portions 10 and the second inclined portions 11 configured as such suppress the steering easiness and the steering response during cornering from becoming abrupt. In the present embodiment, each of the first inclined portions 10 and the second inclined portions 11 is a continuous arc on each side in the tire axial direction of the tire equator (C).

In the present embodiment, each of the first inclined portions 10 and the second inclined portions 11 is formed in an arc shape convex axially outward. In other words, each of the first inclined portions 10 and the second inclined portions 11 has an inflection point on the tire equator (C), and has an arc shape convex axially outward on each side of the tire equator (C). The ply reinforcing portion 8 configured as such exerts the above-described effects further effectively.

At the axially outer ends (8e) of the ply reinforcing portion 8, the first inclined portions 10 and the second inclined portions 11 are connected by connecting portions 16. The connecting portions 16 configured as such maintain the rigidity high at the outer ends (7e) of the tread reinforcing layer 7. Each of the connecting portions 16 in the present embodiment smoothly connects the first inclined portion 10 and the second inclined portion 11. Each of the connecting portions 16 connects a respective one of the first inclined portions 10 and a respective one of the second inclined portions 11 so as to form a single arc having the same radius of curvature, for example.

At the outer ends (8e) of the ply reinforcing portion 8, each of the angles θ3 of the connecting portions 16 with respect to the tire circumferential direction is zero degrees. The ply reinforcing portion 8 of the present embodiment is not provided with a portion in which the angle θ3 of any one of the connecting portions 16 is continuously zero degrees. The ply reinforcing portion 8 configured as such suppresses an excessive increase in the rigidity of the outer ends (8e) thereof, therefore, the ply reinforcing portion 8 makes the steering easiness and the steering response smoother. Note that the present invention is not limited to such an embodiment, a portion in which the angle θ3 of the connecting portion 16 is continuously zero degrees may be formed with a small length (not shown), for example.

Each of the first inclined portions 10 and the second inclined portions 11 is point symmetric on the tire equator (C), for example. Further, the first inclined portions 10 are line-symmetric with the second inclined portions 11 with respect to the tire equator (C) when the first inclined portions 10 are moved in the tire circumferential direction by an arbitrary distance. The first inclined portions 10 and the second inclined portions 11 configured as such make the right and left cornering smooth. Note that each of the first inclined portions 10 and the second inclined portions 11 is not limited to those having a point-symmetric configuration with respect to a point thereof on the tire equator (C).

In the lattice-shaped portion 14 of the present embodiment, the intersection portions 15 are not provided on the tire equator (C). In other words, the first inclined portions 10 and the second inclined portions 11 are alternately arranged on the tire equator (C). The ply reinforcing portion 8 configured as such decreases the rigidity difference on the tire equator (C) and helps a smooth roll from straightaway driving to cornering. It should be noted that the lattice-shaped portion 14 may have the intersection portions 15 provided on the tire equator (C). The lattice-shaped portion 14 configured as such improves the stability performance during straightaway driving.

In the present embodiment, the space portions (13a) arranged on the inner side in the tire axial direction are formed to have axial lengths larger than those of the space portions (13b) arranged on the outer side in the tire axial direction. The space portions 13 configured as such increase the rigidity of axially outer pans of the ply reinforcing portion 8, therefore, the stability performance in the late stage of cornering is further improved.

The motorcycle tire 1 configured as such can be used for both front wheels and rear wheels, for example. However, the tire 1 of the present embodiment improves the steering easiness and the steering response during cornering, especially the stability performance in the late stage of cornering. In order to effectively exert various performances described above, it is preferred that the tire 1 of the present embodiment is used for front wheels.

Figure 4:
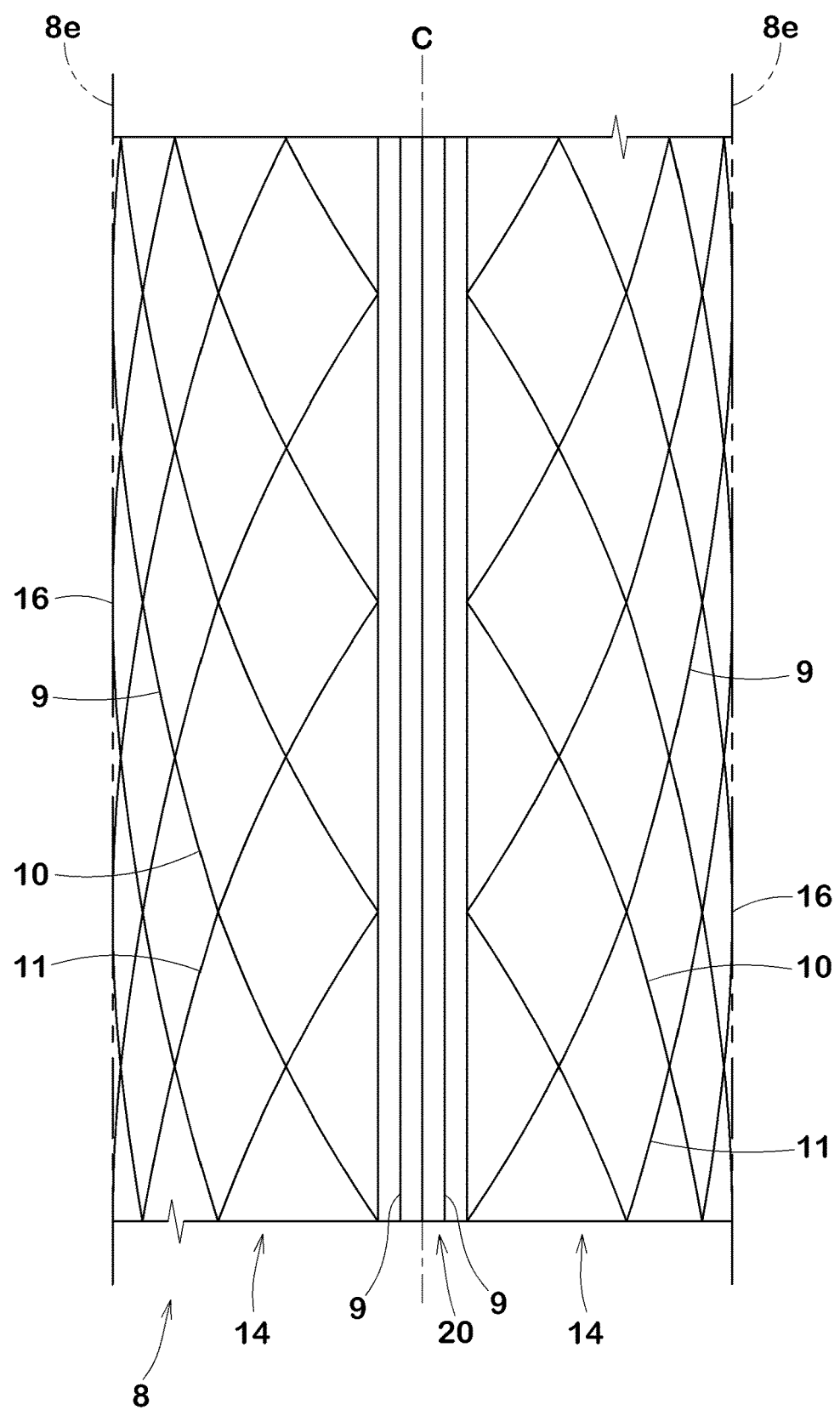
FIG. 4 an overall development view of the ply reinforcing portion of the tread reinforcing layer according to another embodiment.

FIG. 4 is a development view of the ply reinforcing portion 8 according to another embodiment. The same reference numerals are given to the elements common to those of the ply reinforcing portion 8 of the above-described embodiment, and the explanations thereof are omitted here. As shown in FIG. 4, the ply reinforcing portion 8 includes the lattice-shaped portion 14 and a spiral portion 20, for example. The ply reinforcing portion 8 of this embodiment includes a pair of the lattice-shaped portions 14 arranged on both sides in the tire axial direction and the spiral portion 20 arranged between the lattice-shaped portions 14 and on the tire equator (C).

In this embodiment, the spiral portion 20 is formed by the belt-shaped plies 9 wound spirally in the tire circumferential direction. The ply reinforcing portion 8 configured as such exerts a large restraining force, therefore, it suppresses the deformation of the tread portion 2 including the carcass 6, thereby, the stability performance during running is improved.

While detailed description has been made of the motorcycle tire according to an especially preferred embodiment of the present invention, the present invention can be embodied in various forms without being limited to the illustrated embodiments. [Working examples (Examples)]

Motorcycle tires having the basic structure shown in FIG. 1 and FIG. 2 were made by way of test according to the specifications listed in Table 1. Evaluation tests were carried out for these tires on rigid impression, responsiveness, the steering easiness, and the stability performance in the late stage of cornering. Common specifications of the test tires and the test methods were as follows.

Belt-shaped ply: width of 4.0 mm, thickness of 1.0 mm
Width (Wt) of tread reinforcing layer/Tread width TW: 90%
<Rigid Impression, Responsiveness, Steering Easiness, Stability Performance in Late Stage of Cornering>

The test tires were mounted on all wheels of a motorcycle with a displacement of 1300 cc under the following conditions. A test rider drove the above motorcycle on a dry asphalt road surface of a test course. The rigid impression, the responsiveness, the steering easiness, and the stability performance in the late stage of cornering were evaluated during the test drive by the test driver's feeling. The results are indicated by an evaluation point on a scale of 1 to 5. A larger numerical value is better. It should be noted that, "Absence" in "Changes in Angles of First and Second inclined portions" in Table 1 means that each of the angles of the first inclined portions and the second inclined portions is constant from the tire equator (C) up to the respective outer ends in the tire axial direction. Further, "Presence" in the same means that the angle is decreased continuously from the tire equator (C) up to the respective outer ends in the tire axial direction.

Tire size: 12070R17 (front wheel), 190/55R17 (rear wheel)
Tire rim: 17M/CxMT3.50 (front wheel), 17M/CxMT5.50 (rear wheel)
Tire inner pressure (all wheels): 250 kPa
Test results are shown in Table 1.

TABLE 1

|  | Ref. | Ex. 1 | Ex. 2 | Ex. 3 | Ex. 4 | Ex. 5 |
| --- | --- | --- | --- | --- | --- | --- |
| Changes in Angles of First and Second inclined portions | Absence | Presence | Presence | Presence | Presence | Presence |
| Angle θ1 [degree] | 9 | 9 | 2 | 9 | 9 | 17 |
| Angle θ2 [degree] | 9 | 15 | 8 | 23 | 28 | 24 |
| Rigid impression [Evaluation point: larger numerical value is better] | 3 | 5 | 5 | 4 | 3 | 4 |
| Responsiveness [Evaluation point: larger numerical value is better] | 3 | 5 | 4 | 4 | 4 | 5 |
| Steering easiness [Evaluation point: larger numerical value is better] | 3 | 4 | 4 | 4 | 4 | 4 |
| Stability performance in a late stage of cornering [Evaluation point: larger numerical value is better] | 3 | 5 | 4 | 5 | 5 | 4 |
| Comprehensive evaluation [Total: larger numerical value is better] | 12 | 19 | 17 | 17 | 16 | 17 |

From the test results, it was confirmed that the motorcycle tires in each of Examples were excellent in various performances compared with the motorcycle tires in Reference. Further, when the material of the reinforcing cords was steel, it was possible that the occurrence of tilting was further suppressed.

DESCRIPTION OF REFERENCE SIGNS 1 tire
7 tread reinforcing layer
8 ply reinforcing portion
9 belt-shaped ply
first inclined portion
11 second inclined portion
13 space portion
14 lattice-shaped portion

The invention claimed is:
1. A motorcycle tire comprising a toroidal carcass, and a tread reinforcing layer arranged outside the carcass in a tire radial direction and inside of a tread portion, wherein
the tread reinforcing layer includes a ply reinforcing portion in which belt-shaped plies are wound,
each of the belt-shaped plies is formed by at least one reinforcing cord covered with a topping rubber,
the ply reinforcing portion includes a plurality of first inclined portions, in which the belt-shaped plies are inclined to one side with respect to a tire circumferential direction, and a plurality of second inclined portions, in which the belt-shaped plies are inclined to a side opposite to the plurality of the first inclined portions with respect to the tire circumferential direction, the plurality of the first inclined portions is arranged such that side edges thereof are not in contact with each other, the plurality of the second inclined portions is arranged such that side edges thereof are not in contact with each other, the ply reinforcing portion includes a lattice-shaped portion in which the plurality of the first inclined portions and the plurality of the second inclined portions intersect with each other so as to have space portions between them, in each of the first inclined portions and the second inclined portions, an angle thereof with respect to the tire circumferential direction continuously decreases from an inner side in a tire axial direction to an outer side in the tire axial direction, the tread width is a distance between tread edges in the tire axial direction and is a maximum width of the motorcycle tire, each of the angles between the tire circumferential direction and each of the first inclined portions and the second inclined portions at axially innermost points thereof is 10 degrees or more and 20 degrees or less, each of the first inclined portions and the second inclined portions crosses a tire equator, each of the first inclined portions and the second inclined portions is point symmetric on the tire equator, the first inclined portions are line-symmetric with the second inclined portions with respect to the tire equator when the first inclined portions are shifted in the tire circumferential direction, and intersection portions are not provided on the tire equator.

2. The motorcycle tire according to claim 1, wherein the space portions are arranged in the tire axial direction, and the space portions arranged on the axially outer side have axial lengths smaller than those of the space portions arranged on the axially inner side.

3. The motorcycle tire according to claim 1, wherein the belt-shaped plies are not provided with a portion in which the angle with respect to the tire circumferential direction is continuously zero degrees in the tire circumferential direction.

4. The motorcycle tire according to claim 1, wherein each of the first inclined portions and the second inclined portions extends between ends of the ply reinforcing portion on both tread edge sides.

5. The motorcycle tire according to claim 1, wherein in each of the first inclined portions and the second inclined portions, the angle changes continuously from a tire equator to an end thereof on a side of a tread edge.

6. The motorcycle tire according to claim 1, wherein the ply reinforcing portion includes a spiral portion arranged on a tire equator and a pair of the lattice-shaped portions arranged on both sides in the tire axial direction of the spiral portion, and the spiral portion is formed by the belt-shaped plies wound spirally in the tire circumferential direction.

7. The motorcycle tire according to claim 1, wherein the ply reinforcing portion is provided with a plurality of intersection portions, each in which one of the first inclined portions and one of the second inclined portions intersect, arranged in the tire axial direction, and at an axially outermost one of the intersection portions, each of the angles of the first inclined portion and the second inclined portion is 3 degrees or more and 15 degrees or less.

8. The motorcycle tire according to claim 7, wherein the intersection portions are not provided on a tire equator.

9. The motorcycle tire according to claim 1, wherein the reinforcing cord is made of a steel cord or an organic fiber.

10. The motorcycle tire according to claim 9, wherein the reinforcing cord is made of organic fiber, and the organic fiber includes a nylon fiber, a polyester fiber, a rayon fiber, a polyethylene naphthalate fiber, or an aramid fiber.

11. The motorcycle tire according to claim 1, wherein the ply reinforcing portion is provided at an axially outer end thereof with a plurality of connecting portions each in which the first inclined portion and the second inclined portion are connected.

12. The motorcycle tire according to claim 11, wherein each of the connecting portions connects a respective one of the first inclined portions and a respective one of the second inclined portions so as to form a single arc having a same radius of curvature.

13. The motorcycle tire according to claim 1, wherein each of the first inclined portions and the second inclined portions is formed in an arc shape.

14. The motorcycle tire according to claim 13, wherein each of the first inclined portions and the second inclined portions is a continuous arc on each side in the tire axial direction of a tire equator.

15. The motorcycle tire according to claim 13, wherein each of the first inclined portions and the second inclined portions is formed in an arc shape convex axially outward.

16. The motorcycle tire according to claim 15, wherein each of the first inclined portions and the second inclined portions has the arc shape convex axially outward on each side of a tire equator so as to have an inflection point on the tire equator.

* * * * *